Dec. 15, 1953 R. E. GROVE 2,662,563
APPARATUS ADAPTED TO THE CUTTING, SHAPING, OR
FORMING OF STRUCTURAL MEMBERS
Filed May 19, 1952 3 Sheets-Sheet 1
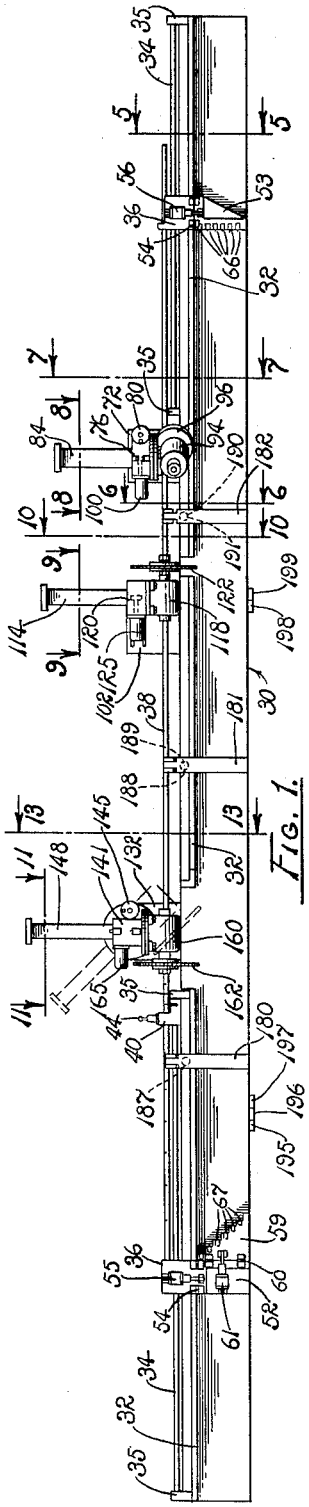
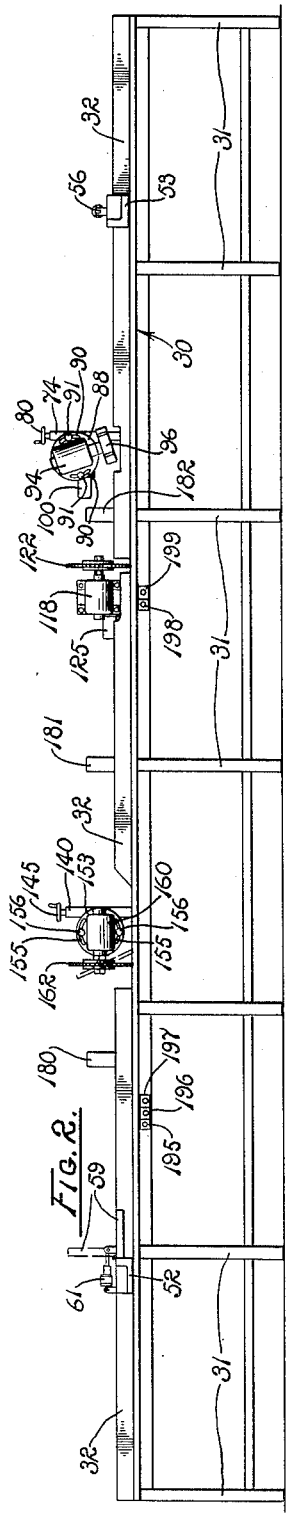
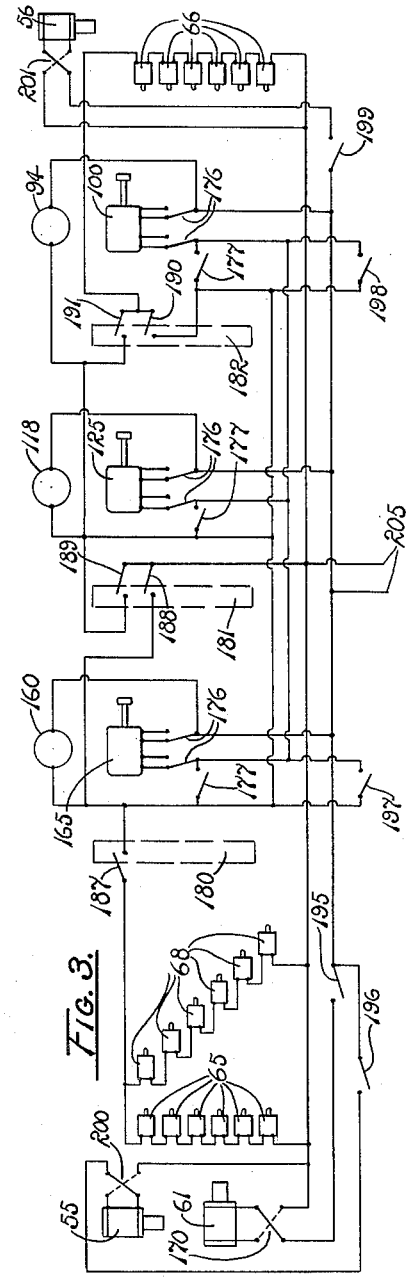
RUSSELL E. GROVE
INVENTOR
HUEBNER, BEEHLER,
WORREL & HERZIG
ATTORNEYS
BY Richard M. Worrel

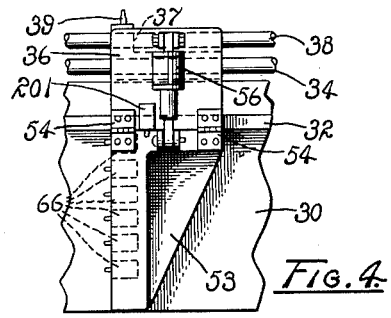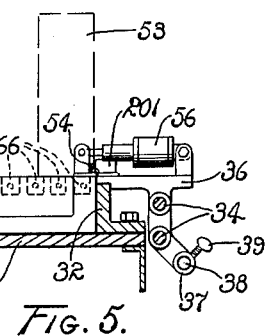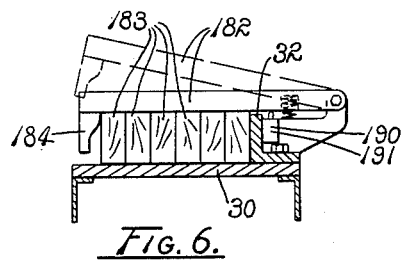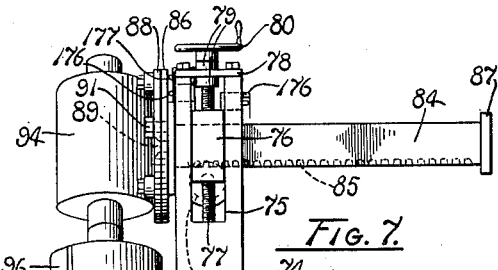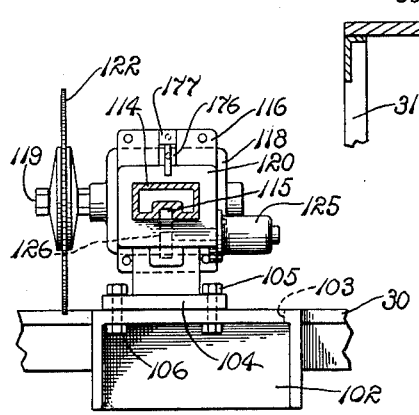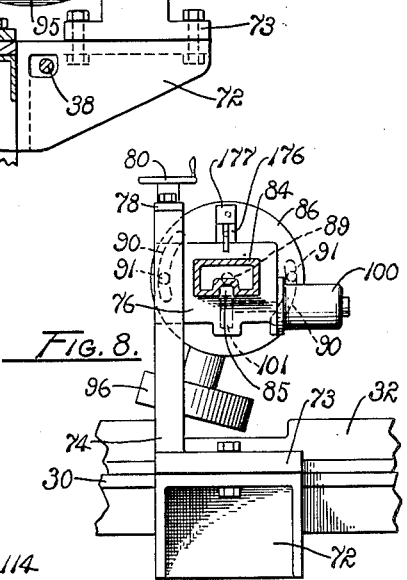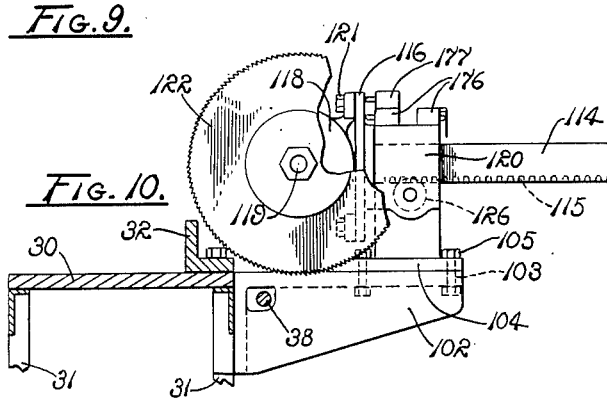

Dec. 15, 1953  R. E. GROVE  2,662,563
APPARATUS ADAPTED TO THE CUTTING, SHAPING, OR
FORMING OF STRUCTURAL MEMBERS
Filed May 19, 1952  3 Sheets-Sheet 3
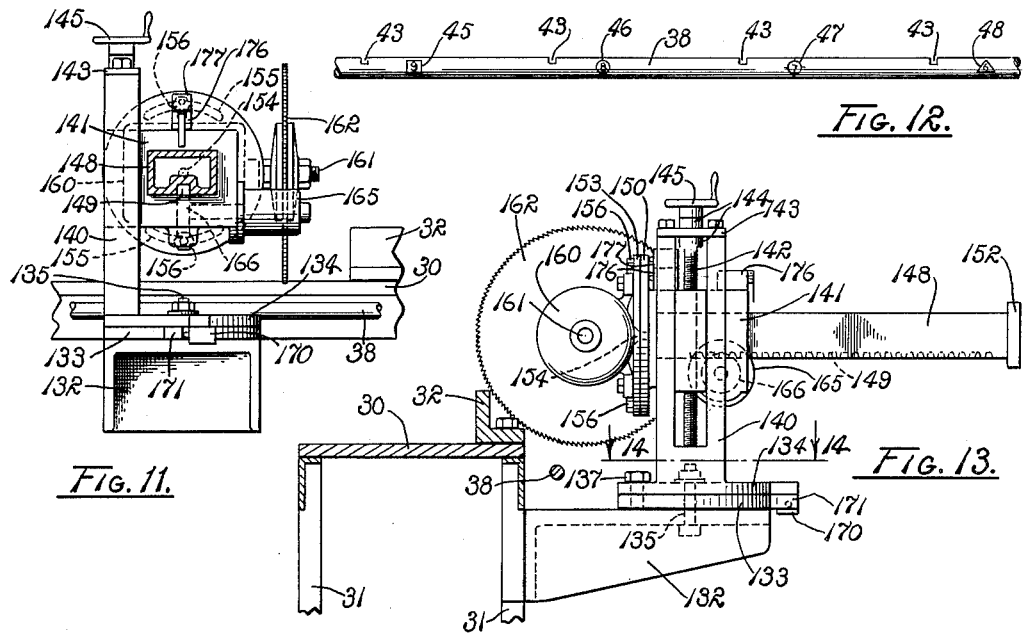
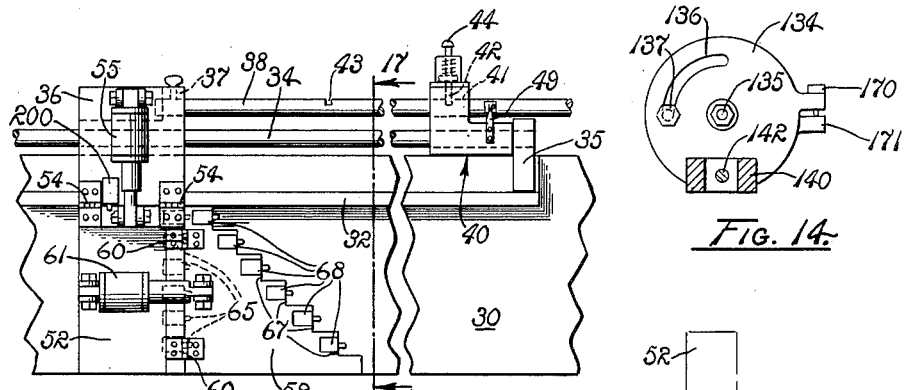
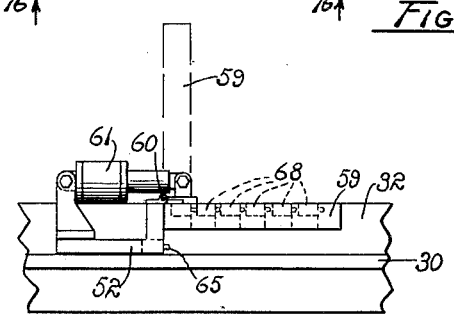
RUSSELL E. GROVE
INVENTOR
HUEBNER, BEEHLER,
WORREL & HERZIG
ATTORNEYS Patented Dec. 15, 1953

2,662,563

UNITED STATES PATENT OFFICE 2,662,563

APPARATUS ADAPTED TO THE CUTTING, SHAPING, OR FORMING OF STRUCTURAL MEMBERS

Russell E. Grove, Fresno, Calif.

Application May 19, 1952, Serial No. 288,678

1 Claim. (Cl. 143—47)

The present invention relates to power driven tools and more particularly to an apparatus especially adapted to the cutting, shaping, or forming of structural members utilized in building construction.

The efficacy of the apparatus of the present invention is readily demonstrated by reference to the frame construction of buildings such as that popularly employed in dwellings. Although power driven saws, routers, and the like, are useful in cutting, shaping, or forming structural lumber, such tools are conventionally utilized in forming single cuts or grooves during a given operation and, although the powered motivation thereof saves manual effort and increases the speed of operation, the forming of the members is still essentially a manual operation in the selection, measuring, and manipulation with tools and lumber.

The great variety of structural members required makes their production a time consuming operation which can be performed only by expert craftsmen or under the supervision thereof.

Most of the structural members in frame dwellings are formed of lumber commonly referred to as "2 x 4's." In the formation of studding, 2 x 4's are cut to predetermined length and provided with squared opposite ends. This is probably the simplest structural member required. In the formation of a common rafter, it is necessary to provide a squared end on a 2 x 4, a plate-fitting notch in spaced relation to the squared end, and an angular opposite end. In all but the simplest roof structures, there are many more complex rafters than that described. A jack rafter provides the squared end, the plate-fitting notch, and an opposite end having a compound angle, that is, an end cut at an angle across the side of the 2 x 4 of which the jack rafter is formed, as well as at an angle across the edge thereof. Rafters extended between parallel valleys and hips of complex roof structures do not require plate-fitting notches but necessitate the formation of both ends thereof in parallel planes of compound angularity relative to the length of the rafter, as described for one end of the jack rafter. Rafters extended between angularly related valleys and hips require ends having compound angularity, as described, terminating in planes which are angularly related in correspondence to the angularity of the valley and hip with due regard to the desired pitch of a roof being constructed. Still further, rafters are frequently required between valleys and ridges having one end of compound angularity relative to the length of the rafter and an opposite end of simple angularity, as described for one end of a common rafter. While structural members of many other forms will readily occur to anyone skilled in the art, the studding, common rafters, jack rafters, two types of valley-to-hip rafters, and valley-to-ridge rafters will serve to demonstrate use of the subject invention and will subsequently be referred to in connection with their formation.

An object of the present invention is to provide an improved means for forming, shaping, or cutting structural members for buildings and the like.

Another object is to minimize labor expenses incident to building construction.

Another object is to provide a power driven apparatus adapted to expedite the formation of structural members of the character described.

Another object is to provide a power driven apparatus adapted to minimize errors productive of wasted labor and material in the cutting of structural members.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

Fig. 1 is a plan view of an apparatus embodying the principles of the present invention.

Fig. 2 is a front elevation of the apparatus shown in Fig. 1.

Fig. 3 is a fragmentary electrical diagram illustrating the control system of the present invention.

Fig. 4 is a somewhat enlarged fragmentary plan view of a table, bracket, stop, and stop positioning means utilized in the apparatus.

Fig. 5 is a somewhat enlarged section taken on line 5—5 of Fig. 1.

Fig. 6 is a somewhat enlarged section taken on line 6—6 of Fig. 1.

Fig. 7 is a somewhat enlarged section taken on line 7—7 of Fig. 1.

Fig. 8 is a somewhat enlarged section taken on line 8—8 of Fig. 1.

Fig. 9 is a somewhat enlarged section taken on line 9—9 of Fig. 1.

Fig. 10 is a somewhat enlarged section taken on line 10—10 of Fig. 1.

Fig. 11 is a somewhat enlarged section taken on line 11—11 of Fig. 1

Fig. 12 is an enlarged fragmentary plan view of a spacing bar utilized in the apparatus.

Fig. 13 is a somewhat enlarged section taken on line 13—13 of Fig. 1.

Fig. 14 is a horizontal section taken on line 14—14 of Fig. 13.

Fig. 15 is a fragmentary foreshortened somewhat enlarged plan view of the structure shown at the left portion of Fig. 1, as viewed.

Fig. 16 is a somewhat enlarged fragmentary side elevation of the table, a stop, an auxiliary stop, and control means as viewed from line 16—16 in Fig. 15.

Fig. 17 is a section taken on line 17—17 of Fig. 15.

Referring in greater detail to the drawings:

An elongated table is indicated at 30 supported at any convenient height by legs 31. A fence 32 is mounted at a longitudinal edge of the table and with stops, soon to be described, defines lumber-receiving areas on the table. The edge on which the fence is mounted is referred to as the rearward edge of the table.

A pair of rods 34 are mounted in parallel relation on the table 30 rearwardly of the fence 32 as by bracket arms 35. A pair of brackets 36 are slidably mounted in spaced relation on the rods adjacent to the table in a position elevated above the rods sufficient for extension of the brackets toward the table above the fence, as evident in Fig. 17. A sleeve 37 is provided integrally with each bracket at a position rearwardly of the fence 32. An elongated spacer rod 38 is slidably mounted in the sleeves 37 of both of the brackets 36 and a set screw 39 extended through each of the sleeves for spaced rod engagement in locking the brackets 36 in predetermined spaced relation on the spacer rod for unitary slidable movement longitudinally of the table on the rods 34. For reasons soon to become apparent, the rods 34 and the spacer rod 38 are provided at such a position rearwardly of the fence 32 and at such an elevation as to avoid interference with power driven tools soon as to be described.

As evident in Figs. 1 and 15, a latch housing 40 is rigidly mounted on the fence 32 and rearwardly extended therefrom providing a sleeve portion 41 in slidable circumscribing relation to the spacer rod 38. A spring-pressed latch 42 is mounted in the housing and has an end disposed for engagement with the spacer rod. The spacer rod is provided with notches 43 in predetermined positions spaced longitudinally thereof. The spring-pressed latch is adapted to be received in the notches to lock the spacer rod in predetermined position relative to the table. The latch provides an exposed knob 44, integral therewith, by which the latch can be withdrawn from notch engagement adjustably to position the spacer rod. As an adjusting convenience, the spacer rod 38 has etched, indented, or othewise defined thereon, a plurality of symbols indicative of rod positioning, to form predetermined structural members. For example, the applicant prefers to use a square 45 to designate a setting for a common rafter, a circle 46 to designate a setting for a jack rafter, a circle with radial lines 47 to designate a setting for a valley-to-hip rafter, and a triangle 48 to designate a setting for a valley-to-ridge rafter, etc. A number for each is designated within the indicating symbol to specify the length of structural member to be formed at a given setting of the spacer rod. The designating symbols are provided on the spacer rod adjacent to notches 43 therein which when engaged by the latch 42 position the spacer bar for the formation of a designated structural member. A pointer 49 is mounted on the latch housing 40 in proximity to the spacer rod for convenience in locating the rod by visual reference to the designating symbols thereon.

Transverse stops 52 and 53 are pivotally mounted on the brackets 36 as at 54 observable in Figs. 1, 15, 16, and 17. The transverse stops are pivoted between operable positions rested transversely on the table 30 and retracted upwardly pivoted positions. For control of the positioning of the stops 52 and 53, solenoids 55 and 56 are pivotally connected between the brackets 36 and the transverse stops 52 and 53, respectively.

The transverse stop 52, preferably mounted on the bracket at the left end of the table 30, as viewed in Fig. 1, pivotally mounts an auxiliary stop 59 as at 60 for movement between a substantially horizontal position extended longitudinally of the table 30 toward the transverse stop 53, as shown in Figs. 1 and 15, and an upwardly pivoted retracted position shown in dash line in Fig. 2. It will be observed that the auxiliary stop is appreciably thinner than its transverse stop 52 and is not rested directly upon the table, but when disposed in operable position is in sufficiently closely spaced relation to the table to engage 2 x 4's or other workpieces, not shown, rested on the table. A solenoid 61 pivotally interconnects the transverse stop 52 and the auxiliary stop 59 and is utilized pivotally to position the auxiliary stop from a remote and more convenient control point.

A plurality of conditioning switches 65 are mounted on the transverse stop 52 in spaced relation to the fence 32 and disposed for individual engagement by 2 x 4's, or other workpieces of predetermined size, rested on edge on the table and against the fence. The conditioning switches 65 are mounted on the stop 52 below the auxiliary stop 59 so as to avoid interference therewith. Somewhat similarly, conditioning switches 66 are mounted on the transverse stop 53 in spaced relation to the fence for individual engagement with 2 x 4's rested on edge on the table. The auxiliary stop provides a plurality of staggered faces 67, each transversely disposed to the table and of a width substantially equal to the thickness of a 2 x 4. The faces are spaced longitudinally of the table a distance substantially equal to their width so that the staggered or echelon arrangement thereof can be regarded as in substantially 45° angular relation to the length of the table. An auxiliary conditioning switch 68 is mounted in alignment with each of the faces 67 on the auxiliary stop 59 for engagement with 2 x 4's rested on edge on the table against the fence and endwardly abutting the faces. The switches 65, 66 and 68 are referred to as conditioning switches in asmuch as they condition their respective circuits for actuation. That is, when they are closed by engagement of a workpiece thereagainst, their respective circuits are operable, when not so closed, their circuits are inoperable.

A table extension or shelf 72, shown in Figs. 2, 7, and 8 is rigidly mounted on the table 30 and rearwardly extended therefrom in spaced relation to the right end of the table, as viewed in Fig. 1. A plate 73 is bolted or otherwise secured to the shelf and mounts a tubular post 74 in vertical position thereon. The post is longitudinally slotted at 75. A carriage base 76 has an extension slidably fitted to the slot 75. An elevating shaft 77 is journaled in the post in a substantially erect position and held in fixed elevational relation therein as by a thrust plate 78 mounted on the upper end of the post in circumscribing relation to the shaft and thrust washers 79 rigidly mounted on the shaft on opposite sides of the plate. The shaft 77 is screw-threadably engaged in the post of the base 76 extended into the slot 75. For convenience in rotating the shaft, a hand wheel 80 is mounted on the upper end thereof. It will be evident, that by rotating the shaft 77 the base 76 is elevationally adjustable in the post. An elongated carriage arm 84 having a rack gear 85 is slidably mounted in the base 76 for reciprocal horizontal movement transversely of the table. The carriage arm 84 has a circular plate 86 mounted on the end thereof adjacent to the table in a substantially erect plane and mounts a stop 87 on the opposite end of said arm. A circular adjustable plate 88 is rotatably mounted in facing engagement concentrically on the plate 86 as by a pivot bolt 89. The adjustable plate is provided with an arcuate slot 90 concentric thereto through which a headed locking bolt 91 is extended and screw-threadably engaged in the fixed plate 86.

A tool motor 94 having a drive shaft 95 is rigidly mounted on the adjustable plate 88 with the drive shaft 95 diametrically related thereto. A router head 96 is mounted on the drive shaft for engagement with workpieces rested on the table.

A reversible driving motor 100 is mounted on the base 76 and provides a pinion 101 in mesh with the rack gear 85.

A shelf 102, evident in Figs. 1, 9, and 10, similar to shelf 72 is also rigidly mounted on the table 30 and rearwardly extended therefrom. A pair of elongated slots 103 are formed through the shelf in parallel relation to the table. A base 104 is mounted on the shelf 102 in adjustable positions longitudinally of the table by means of bolts 105 extended through a portion of the base and the slots 103 and providing nuts 106 tightened against the shelf.

The base 104, like the base 76, mounts a carriage arm 114 similar to the carriage arm 84 for slidable movement therethrough transversely of the table 30. The carriage arm provides a rack gear 115 and a mounting plate 116 adjacent to the table and has a stop 117 on the opposite end thereof. A tool motor 118 having a drive shaft 119 and a base 120 is rigidly mounted on the mounting plate 116 as by bolts 121 with the drive shaft horizontally extended in substantially parallel relation to the table. A saw blade 122 is mounted on the drive shaft 119.

A reversible driving motor 125 is mounted on the base 120 and has driving connection to the rack gear 115 by means of a pinion 126.

No provision has been made for the elevational adjustment of the tool motor 118 nor its angular adjustment relative to the table. It is to be understood that such adjustability may be provided if desired in the manner described for the router tool motor 94 or otherwise.

A shelf 132 is rigidly mounted on the table 30 and rearwardly extended therefrom intermediate the transverse stop 52 and the shelf 102, evident in Figs. 1, 11, and 13. A circular mounting plate 133 is weldably or otherwise secured to the shelf 132 in a substantially horizontal position, an upper mounting plate 134 is rotatably mounted in facing engagement with the plate 133 by a headed bolt 135 journaled in the upper plate 134 and secured to the mounting plate 133. The upper mounting plate 134 has a concentric arcuate slot 136 formed therein, preferably traversing 90° of the upper plate and a headed bolt 137 is extended through the slot and screw-threadably engaged in the plate 133 to lock the upper plate in adjusted rotational position.

A longitudinally slotted post 140 similar to the post 74 is weldably mounted eccentrically in the upper plate 134 and upwardly extended therefrom. A base 141 has a portion extended into the slot of the post and is mounted for adjustable elevational movement on the post. An elevating shaft 142, thrust plate 143, thrust washers 144, and hand wheel 145 are mounted in the post and by screw-threaded engagement of the shaft with the base 141 provide adjustable elevational movement of the base in the manner previously described in connection with the mounting of the base 76.

A carriage arm 148 having a rack gear 149, similar to the carriage arms 84 and 114, is slidably mounted in the base 141 for reciprocal movement transversely of the table 30. The carriage arm has an end adjacent to the table provided with a circular mounting plate 150 mounted thereon in a substantially erect plane and an opposite end providing a stop 152. A circular adjustable plate 153 is rotatably mounted concentrically on the mounting plate 150 by a journal bolt 154 extended concentrically through the adjustable plate and rigidly mounted in the plate 150. A pair of arcuate slots 155 are formed concentrically through the adjustable plate and headed bolts extend through the end screw-threadably engaged in the mounting plate.

A tool motor 160 having a drive shaft 161 is rigidly mounted on the adjustable plate 153 with the drive shaft in substantially parallel relation thereto. A saw blade 162 is mounted on the drive shaft 161 in the usual manner.

A reversible driving motor 165 is mounted on the base 141 and has driving connection to the carriage arm 148 by means of a pinion 166. A reversible switch 170 is mounted on the adjustable plate 153 and a stop 171 provided on the fixed plate 150 for engagement with the reversible switch. The arrangement of the arcuate slot 136 and headed bolt 137 and the positioning of the switch 170 and stop 171 are such that the carriage arm 148 may be transversely disposed to the table, in which event the reversible switch 170 engages the stop, and may be pivoted in a counter clockwise direction, as viewed in Fig. 1, until in substantially 45° angular relation to the table, in which condition the reversible switch has disengaged the stop and is electrically reversed for reasons soon to become apparent.

In relating to the switches, it should further be observed that reversible switches 176 are mounted on each of the bases 76, 104, and 141 for alternate engagement by the stops 87, 117, and 152 of their respective carriage arms and the mounting plates 86, 116, and 153 respectively to effect successive reversing of the switches. Further, limit switches 177 are mounted on said bases for engagement by the designated mounting plates. The limit switches are resiliently urged to closed position and are opened by mounting plate engagement.

Elongated clamps 180, 181, and 182 are pivotally mounted on the fence 32 respectively between the stop 52 and the shelf 132, between the stop 52 and the carriage arm 148, between the carriage arm 148 and the carriage arm 114, and between the carriage arm 114 and the carriage arm 84. As indicated in Fig. 6, the clamps are adapted to overlay 2 x 4's rested on each of the thirty individual camming fingers 184 shaped to urge the 2 x 4's against the fence when thrust downwardly into clamping position. Each of the clamps are manually positionable between a retracted upwardly extended position and a clamping position transversely extended across the table. A control switch 187 is mounted for actuation by the clamp 180. A pair of control switches 188 and 189 are mounted for concurrent actuation by the clamp 181. Similarly a pair of control switches 190 and 191 are mounted for actuation by the clamp 182. The control switches are resiliently urged into open position and are closed only by thrusting their respective clamps downwardly into clamping position.

As evident in Fig. 2, the fence 32 is relieved adjacent to the saw blades 122 and 162 and adjacent to the router head 96 for passage of the saw blades through the fence and 2 x 4's rested on the table to cut the 2 x 4's in two and for passage of the router head through the fence and through the upwardly disposed edges of the 2 x 4's.

Five manually operable control switches 195, 196, 197, 198, and 199 are mounted in forwardly disposed positions on the table 30. The switches 195, 196, and 197 are preferably arranged in forwardly disposed positions on the table 30 in conveniently accessible relation adjacent to the clamp 180. The switches 198 and 199 are mounted on the table intermediate the clamps 181 and 182. A reversing switch 200 is mounted on the bracket 36 adjacent to the stop 52 and is reversed by movement of its respective stop to an upwardly pivoted position past the vertical where it may be rested when not in use. Similarly a reversing switch 201 is mounted on the bracket 36 adjacent to the stop 53 so as to be reversed when the stop is pivoted to an upwardly extended position as described for stop 52.

Referring to Fig. 3, the wiring system of the described apparatus becomes clearly apparent. A source of electrical energy is indicated at 205. The circuit connects the conditioning switches 65 and 69 in parallel and said parallel conditioning switches in series with the control switch 187 and the tool motor 160 to the source of electrical energy 205. The circuit connects the control switch 188 in series with the tool motor 160 to the source of electrical energy and the control switch 189 in series with the tool motor 118 also to said source. Thus closing of all of the switches 65 or all of the switches 66 conditions the circuit so that the switch 197 is operable to start and to stop the tool motor 160 and the parallel switches 177 and 197 operable to start and to stop the driving motor 165. Further, the circuit connects the conditioning switches 65 in series with the control switch 191 and the tool motor 94 to the source of electrical energy and said conditioning switches 66 in series with the control switch 190 and the control motor 100 to said source in series with the parallel switches 177 and 198. The closing of the switches 66 conditions the circuit so that the control switch 191 is operable to control the tool motor 94 and the switch 190 is operable to control the motor 100 through the parallel switches 177 and 198. The manually operable control switch 195 is connected electrically in parallel with the limit switch 177 and said parallel switches in series with the reversible switch 176 which is connected to the drive motor 165 in parallel relation to the tool motor 160. The reversing switches 176 are connected to the driving motors 100, 125, and 165 and are each connected in series with their respective limit switches 177 and thence in parallel with their respective tool motors 94, 118, and 160. The manually controlled switch 197 is connected in by-pass relation to each of the limit switches 177. The reversible switch 170 is connected to the solenoid 155 and in series with the manually controlled switch 195 to the source of electrical energy. The reversible switch 200 is connected to the solenoid 61 and in series with the manually controlled switch 196 to the source of electrical energy. The reversible switch 101 is connected to the solenoid 56 and in series with the manually controlled switch 199 to said source.

*Operation*

With brief reference to the operation of the apparatus of the present invention in the formation of studding, common rafters, jack rafters, valley-to-hip rafters, and valley-to-ridge rafters of the character described but not shown, it is believed that the utility of the apparatus will be clearly apparent. For descriptive simplification, the structure described for mounting the tool motor 160 is referred to as the jack rafter carriage, the structure for mounting the tool motor 118 as the studding carriage, and the structure for mounting the tool motor 94 as the router carriage.

To form studding, the jack rafter carriage and the studding carriage are adjustably spaced so that the saw blades 122 and 162 are spaced a distance equal to the length of a studding to be formed and the carriage arm 148 arranged in right angular relation to the table 30. A plurality of 2 x 4's 183 are edgewardly rested on the table against the fence 32 with opposite ends thereof extended past the saw blades. The clamp 181 is manually thrust downwardly into clamping relation to the 2 x 4's closing the switches 188 and 189 energizing the motors 118 and 160 and conditioning the circuits for operation of the motors 125 and 165. It will be recalled that the limit switches 177 are held in open position when their respective carriages are in retracted position. The manual control switch 197 is closed actuating the driving motors 125 and 165 causing the carriages to traverse the table and the 2 x 4's rested thereon so that the driven saw blades cut the 2 x 4's into studding of the desired length. Upon traversing the table the stops 117 and 152 engage the reversing switches 176 reversing the drive motors to retract the carriages. It is only necessary briefly to close the manual switch 197 to initiate the operation for as soon as the carriages have moved from retracted position, the limit switches thereof are closed and remain closed until return of the carriages to retracted positions whereupon they are opened, terminating the cycle.

To cut common rafters, the stop 53 is elevated by the solenoid 56 in response to closing of the manual switch 199. 2 x 4's are rested on edge against the fence 32 with corresponding ends thereof extended past the router carriage and the saw blade 122. The router carriage is elevationally adjusted by manipulation of the hand wheel 80 and the adjustable plate 88 positioned on the bracket 86 to achieve the desired position of the router head 96. The clamp 182 is manually lowered into clamping relation by the 2 x 4's automatically energizing the tool motor 94 and 118 by closing the switches 190 and 191 and preconditioning the drive motors 100 and 125 for operation. By closing the control switch 193, the drive motors 100 and 125 reciprocally travel their respective carriages and power driven tools mounted thereon transversely of the table cutting a square end on each 2 x 4 and providing a router formed notch for said engagement with a cap plate in a frame building construction. The reversing switches 176 and limit switches 177 operate in connection with the motors 100 and 125, as previously described, for the motors 125 and 165.

The switch 195 is closed to lower the stop 52. The adjustable plate 158 is rotated to incline the saw blade 162 as illustrated in dashed line in Fig. 2 to conform to the desired angularity of the ends of the rafters being formed. The latch 42 is engaged in a selected notch 43 placing the bracket 36 mounting the stop 52 in predetermined relation to the saw blade 162 for the rafters to be formed. The manual control switch 196 is closed lowering the stop 52 onto the table by actuation of the solenoid 61. Lowering of the stop conditions the reversing switch 200 so that subsequent closing of the switch 196 serves to raise the stop. The 2 x 4's are slid longitudinally of the table so that the squared ends thereof cut by the saw blade 122 resting against the stop 52 close the switches 65. The clamp 180 is lowered into operating position to hold the 2 x 4's in place closing the switch 187 which energizes the tool motor 160 and conditions the driving motor 165 for operation. Closing the manual switch 197 initiates reciprocal movement of the jack rafter carriage and saw blade 162 transversely across the table forming the angular ends of the rafters.

To form jack rafters, the ends of 2 x 4's 183 are cut and notched by means of the saw blade 122 and router head 96 as described for the common rafters. With the saw blade 162 in the tipped position described and shown in Fig. 2, the upper mounting plate 134 is rotatably positioned on the mounting plate 133 so that the carriage arm 148 is in substantially 45° angular relation to the table 30 as shown in dashed line in Fig. 1. Such adjustment of the upper mounting plate 134 actuates the reversible switch 170 by engagement with the stop 171. Closing of the manual switch 195 lowers the auxiliary stop 59 by actuating the solenoid 55. The squared ends of the 2 x 4's are slid against the faces 67 of the auxiliary stop closing the conditioning switches 66. The clamp 180 is lowered to clamping position closing the control switch 187 to start the tool motor 160 and condition the drive motor 165 for operation. The manual control switch 197 is closed to actuate the driving motor 165 whereupon the saw blade 162 is reciprocated angularly across the table in its tilted position to form ends of compound angularity on the jack rafters.

It will be obvious that reciprocation of the saw blade 162 across the 2 x 4's cuts ends from the jack rafters which if of sufficient length may be conveniently salvaged, as follows: in making jack rafters of a given length, there are always corresponding jack rafters of complementary length. That is, for every 8 ft. jack rafter there is usually a 4 ft. jack rafter. If a 2 x 4 12 ft. long is utilized, the scrap ends of the 2 x 4's may be turned end for end and the ends of compound angularity placed against the stop 53. Preliminary adjustment of the spacing of the stops 52 and 53 on the spacer rod 38 will thus assure that the uncut ends of the scraps are secure across the saw blades 122. The ends of the scraps engage the conditioning switches 66 and close the same. The clamp 182 is again lowered into position closing the switches 190 and 191 actuating the motors 94 and 118. Closing of the manual switch 195 reciprocates the saw blade 122 and the router head 96 transversely of the clamped 2 x 4's forming an additional set of jack rafters.

To form valley-to-hip rafters having opposite ends of compound angularity terminating in parallel planes, the apparatus is conditioned for use with the auxiliary stop 59 in lowered position, with the carriage arm 148 angularly related to the table 30, and with the saw blade 162 tipped. A plurality of 2 x 4's 183 are edgewardly rested on the table against the fence 132 and the clamp 181 lowered to hold the 2 x 4's in place with ends thereof engagable by the saw blade 162. Closing of the manual control switch 197 causes the motor 165 to reciprocate the blade across the 2 x 4's while driven by the motor 160. The ends cut from the 2 x 4's are discarded and the 2 x 4's slid to the left as the table is viewed in Fig. 1, and engaged with the conditioning switches 66. With the auxiliary stop 59 in properly spaced relation to the blade 162, the clamp 180 is lowered and the switch 197 closed cutting the opposite ends of the valley-to-hip rafters.

When valley-to-ridge rafters are to be formed, the same general procedure is followed as in the formation of valley-to-hip rafters except that preliminary to the second cut the auxiliary stop 59 is raised so that the ends of the 2 x 4's can engage the conditioning switches 66 and the carriage arm 148 is returned to right angular relation to the table and the tipped attitude of the saw blade 162 caused to accord with the pitch of the roof desired.

The mass production of other structural members in the apparatus of the present invention will occur to anyone skilled in the art. The apparatus minimizes waste incident to human error and results in a more precisely uniform production. The mass production of studding, rafters, and the like made possible by the subject apparatus substantially minimizes construction costs and building time.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

In a lumber shaping apparatus, an elongated table, a fence mounted longitudinally of the table, a pair of brackets slidably mounted on the table in adjustable spaced relation longitudinally thereof, a push-pull rod interconnecting the brackets in adjustable spaced relation, a transverse stop pivotally mounted on each of the brackets for movement between a position rested transversely on the table and an upwardly pivoted position, an auxiliary stop pivotally mounted on one of the transverse stops for movement between a position extended longitudinally of the table from its respective stop toward the opposite stop and an upwardly pivoted position, means mounted on the table engageable with the push-pull rod releasably to lock the rod in adjusted position longitudinally of the table to locate the brackets in fixed positions longitudinally of the table, and a power driven saw mounted on the table intermediate the stops for engagement with lumber rested on the table.

RUSSELL E. GROVE.

References Cited in the file of this patent

UNITED STATES PATENTS

| Number | Name | Date |
|---|---|---|
| 963,697 | Dyer | July 5, 1910 |
| 1,554,497 | Goff | Sept. 22, 1925 |
| 1,638,122 | Jull | Aug. 9, 1927 |
| 1,934,207 | Pennock | Nov. 7, 1933 |
| 2,142,303 | Crouch | Jan. 3, 1939 |
| 2,260,421 | Tracy | Oct. 28, 1941 |
| 2,347,359 | Miller | Apr. 25, 1944 |
| 2,349,133 | Benton | May 16, 1944 |
| 2,393,617 | De Spain | Jan. 29, 1946 |
| 2,574,163 | Bamford, Sr. | Nov. 6, 1951 |
| 2,574,393 | Hult | Nov. 6, 1951 |
| 2,593,744 | Gillespie | Apr. 22, 1952 |